June 29, 1965  J. V. S. DAHLGREN  3,191,861
TIMER ADJUSTED OVEN TEMPERATURE CONTROL
Filed Dec. 26, 1961  4 Sheets-Sheet 2

INVENTOR.
JOHN V. S. DAHLGREN
BY Roy E. Raney
ATTORNEY

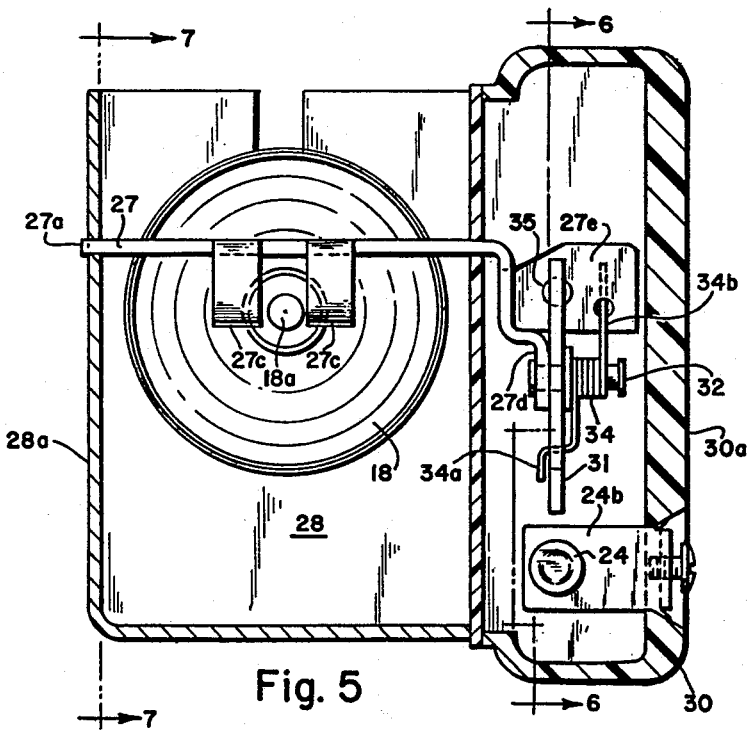
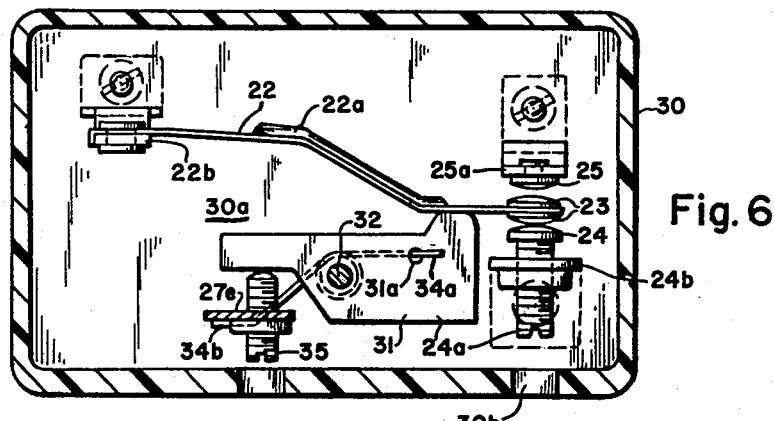
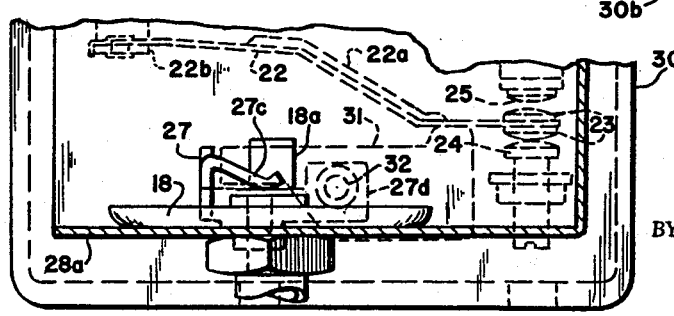
INVENTOR.
JOHN V. S. DAHLGREN
BY Roy E. Raney
ATTORNEY June 29, 1965     J. V. S. DAHLGREN     3,191,861
TIMER ADJUSTED OVEN TEMPERATURE CONTROL
Filed Dec. 26, 1961     4 Sheets-Sheet 4

INVENTOR.
JOHN V. S. DAHLGREN
BY
ATTORNEY

Patented June 29, 1965

3,191,861
TIMER ADJUSTED OVEN TEMPERATURE
CONTROL
John V. S. Dahlgren, Fairhaven, N.J., assignor to The
Wilcolator Company, Elizabeth, N.J., a corporation of
New Jersey
Filed Dec. 26, 1961, Ser. No. 161,813
4 Claims. (Cl. 236—15)

This invention relates to improvements in means for controlling the operation of gas burners or electric heating elements in cooking ovens so as to provide regulation of the temperature of the oven in accordance with a predetermined series of desired temperature changes. More particularly, the present invention is directed to a novel control system by which an oven may be brought to a predetermined temperature, for example 140° F., for a period of time sufficient to thaw a previously frozen food article, after which the oven temperature is raised to a preselected cooking temperature which is maintained for a period of time sufficient to cook the thawed food article. Upon termination of the cooking period a fan is energized to rapidly dissipate the cooking heat from the oven, after which the oven burner or heating element is operated so as to maintain the oven at a temperature suitable for keeping the food hot until served.

It is a principal object of this invention to provide an oven control system or apparatus of the above-mentioned character including a main and auxiliary switch means for controlling energization of a gas oven solenoid valve or electric oven heating element, both of which switch means are operated by a single thermally responsive power element, such as an expansible bellows or diaphragm means connected with a temperature sensing bulb located in the oven and containing a fluid which expands and contracts upon increases and decreases in temperature, and arranged to actuate the respective switch means at the limits of a relatively high and low temperature range, respectively, the system also including time controlled switch means for alternatively selecting the main or auxiliary switch means to control the oven temperature in accordance with a predetermined time cycle so that the auxiliary switch means is effective to control the oven to maintain temperatures in the range of 140° F. and the main switch means is effective to maintain a preselected higher cooking temperature. In addition, the auxiliary switch is preferably adapted to control energization of the oven cooling fan referred to in the preceding paragraph.

As another object this invention aims to provide a thermostatic switch device wherein an expansible power element operates main and auxiliary switch means for the alternative thermostatic control of two or more circuits, the device comprising means forming a yieldable connection between the power element and one of the switch means, so that upon predetermined movement of the power element the one switch means will be actuated from a first operative position to a second operative position and, after which actuation, the connecting means will yield to further movement of the power element so that upon a second predetermined movement the power element will effect actuation of the other of the switch means from a first operative position to another.

The invention may be further described as residing in certain combinations, constructions, and arrangements of parts which provide the foregoing objects and advantages as well as others which will become apparent from the following detailed description of a presently preferred embodiment of the invention read in conjunction with the accompanying sheets of drawings forming a part of this specification, and in which FIG. 1 is a schematic illustration of an oven control system embodying the present invention;

FIG. 5 is a sectional view of the control device of FIG. 4 taken substantially along line 5—5 thereof;

FIG. 6 is a sectional view of the control device as viewed along line 6—6 of FIG. 5;

FIG. 7 is a fragmentary sectional view taken along line 7—7 of FIG. 5; and

Although the control system and thermostatic control device of this invention may be used to control the operation of electric ovens and other appliances such as clothes dryers and the like, having a program of operating events, the invention will be described hereinafter with reference to the control of a gas heated oven of a domestic cook stove, which is desired to provide a first temperature for a period of time sufficient to thaw an article of frozen food, then to provide a higher temperature for a period of time sufficient to cook the food, and then to provide a temperature which will maintain the cooked food hot until removed for serving.

Figure 1:
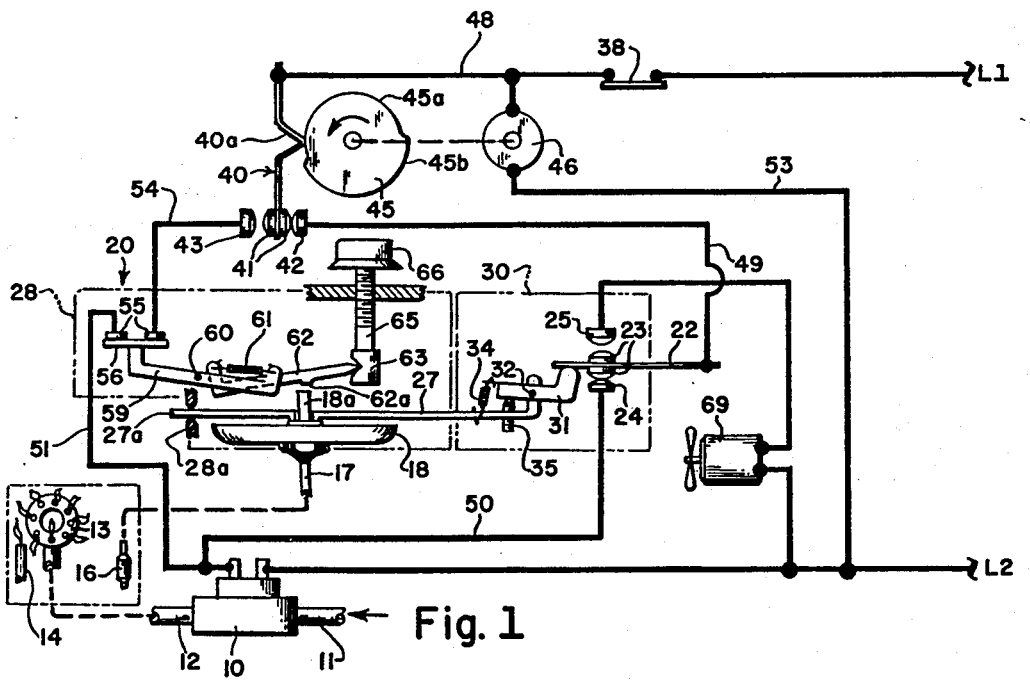
Figure 2:
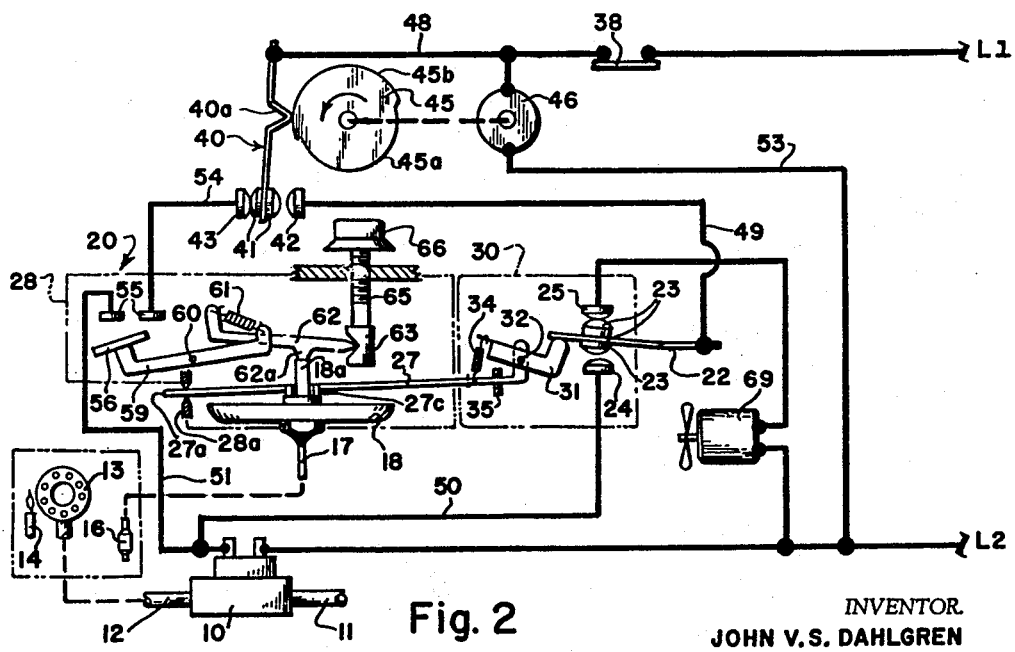
FIGS. 2 and 3 are schematic illustrations similar to FIG. 1 but showing some parts moved to different operating positions.
Figure 3:
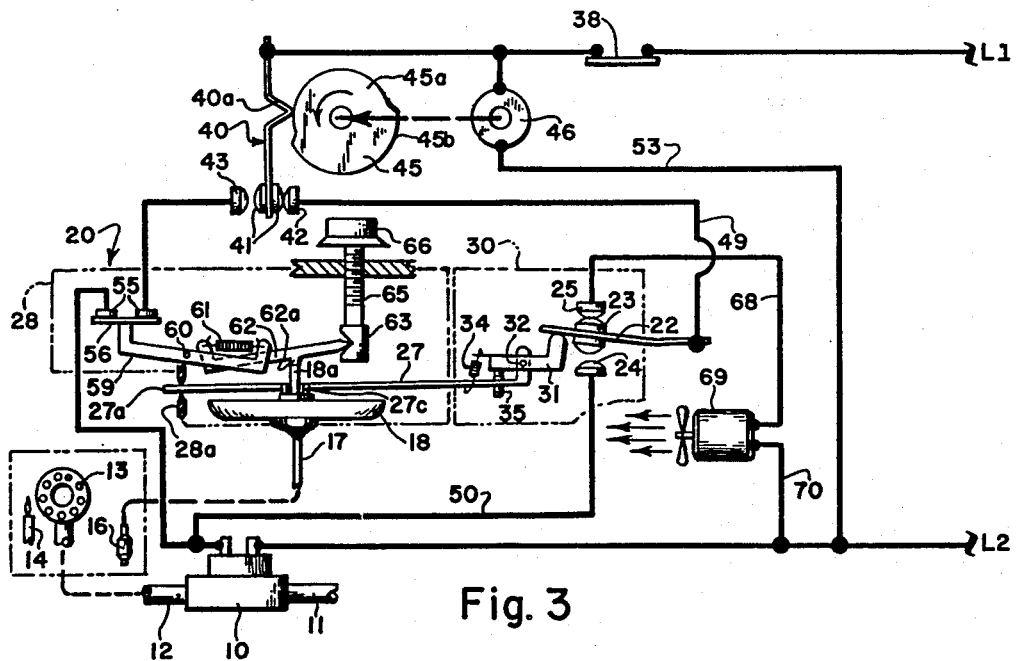

Referring to FIGS. 1, 2 and 3, the control system is shown schematically applied to control the energization of a normally closed solenoid valve 10 which is connected by a pipe 11 to a supply of fuel gas, and is connected by a pipe 12 to an oven heating burner 13. Energization of valve 10 causes it to open and pass fuel gas to burner 13 which is ignited by a standby pilot burner 14 to heat an oven enclosure, not shown. The oven temperatures are sensed by a bulb 16 which is connected by a capillary tube 17 to an expansible power element in the form of a diaphragm or bellows 18 forming part of a control switch mechanism, generally indicated at 20, which intermittently opens valve 10 to operate burner 13 as necessary to maintain the desired thawing, cooking or keeping temperatures all in a manner which will become apparent as the description proceeds.

Control switch mechanism 20, which will later be described in greater detail, comprises a spring arm 22 which is secured at one end and carries a movable double contact 23. Contact 23 is normally biased by arm 22 into engagement with a fixed contact 24 but is movable away therefrom for engagement with a second fixed contact 25. Movement of spring arm 22, and hence of contact 23, is effected by bellows 18 through resiliently yieldable connecting means including a lever 27 which is pivoted at one end, for example by engagement in an opening in a wall 28a of a suitable framework or main switch housing 28, and has projections 27c near the central portion of the lever which engage a shoulder formed on an axially movable post 18a mounted on the movable portion of bellows 18. The other end of lever 27 extends into an auxiliary switch housing 30 secured to housing 28 and carries a rocker arm 31 which is pivoted to the lever as by a pin 32. Rocker arm 31 is normally biased in a counter-clockwise direction, as viewed in the drawings, by a spring 34 acting between the rocker arm and the lever. A set screw 35 extends through a threaded opening in lever 27 and forms an adjustable stop for rocker arm 31. Screw 35 is advanced or retracted as necessary to position rocker arm 31 so that the rocker arm will engage the end of spring arm 22 and separate contact 23 from contact 24 when bellows 18 has expanded a predetermined amount corresponding to a desired oven temperature sensed by bulb 16. In the present instance screw 35 is set to cause contacts 23 and 24 to be opened by rocker arm 31 at a temperature of approximately 140° F. It is to be noted here that the biasing action of spring 34 is sufficient to resist rotation of rocker arm 31 when the latter is moving spring arm 22 to separate contacts 23, 24.

Spring arm 22 is preferably provided with a stiffening bead 22a. Bead 22a minimizes wiping action between contacts 23, 24, and 25 and reduces the tendency of the contacts to chatter during make and break.

Contacts 23 and 24 form part of a circuit for cyclically operating solenoid valve 10 as necessary to cause burner 13 to provide an oven temperature of substantially 140° F. to thaw a previously frozen article of food in preparation for cooking thereof. This thawing circuit also includes a line switch 38, and a cam actuated circuit selecting timer switch 40 having a double contact 41 movable between fixed contacts 42 and 43. Circuit selecting timer switch 40 comprises a cam follower 40a engaged by the periphery of a cam 45 which is adapted to be driven in a counter-clockwise direction by a timer motor 46. The contour of cam 45 includes a cam surface 45a which permits contact 41 to engage contact 42, and a raised surface 45b which is adapted to cause movement of contact 41 against contact 43.

When line switch contact 38 is closed with cam 45 and switch 40 in their FIG. 1 positions, and assuming the oven to be cold and to contain a frozen food article, a circuit will be completed from a power line L1 through switch 38, a conductor 48, contacts 41 and 42, a conductor 49, contacts 23 and 24, a conductor 50, and the solenoid of valve 10 to a power line L2. Rise in oven temperature to approximately 140° F. will cause opening of contacts 23 and 24 by movement of bellows 18, lever 27, and rocker arm 31. Opening of contacts 23 and 24 will break the just described circuit permitting valve 10 to close and the burner 13 to be extinguished. The oven will then cool slightly until contacts 23 and 24 again close and cause the valve 10 to be opened and burner 13 to be ignited. Burner 13 will therefore be cycled as necessary to maintain an oven temperature of approximately 140° F. at which temperature the food in the oven will thaw without cooking.

The closing of line switch 38 serves also to energize timer motor 46, which is conveniently a conventional synchronous clock type motor, and is connected between conductor 48 and line L2 by conductors 52 and 53. Cam 45 is rotated by motor 46 at a constant rate so that the length of cam surface 45a will determine the time period during which contacts 41 and 42 will remain closed and hence the period of time during which the oven will be maintained at thawing temperature.

Thus, as cam 45 rotates to bring the raised cam surface 45b thereof against cam follower 40a of switch 40, contact 41 will be moved away from contact 42 and into engagement with contact 43. Opening of contacts 41, 42 breaks the circuit for controlling the thawing temperature, thereby terminating that stage of the operating cycle, while closing of contacts 41, 43 completes a circuit for initiating the cooking stage of the operating cycle. This circuit, which controls energization of solenoid valve 10 at cooking temperature, may be traced from power line L1 through line switch 38, conductor 48, contacts 41 and 43, a conductor 54, a pair of stationary spaced contacts 55 which are bridged by a movable bridging contact 56 and form part of the control switch device 20, a conductor 51, and the solenoid of valve 10 to power line L2.

Bridging contact 56 is carried at one end of a lever 59 which forms a part of a snap acting mechanism for moving contact 56 into and out of engagement with contacts 55. Now, the snap acting mechanism may be of any suitable type which is known in the art and is operable by movement of a bellows or diaphragm, but is preferably of that type disclosed and fully described in my United States Patent No. 2,859,312. Briefly, however, lever 59 is pivoted as at 60 and has the end thereof, opposite contact 56, connected by an extension spring 61 to one end of a lever 62. Lever 62 has its other end pivoted in an adjustable V-bearing 63, which is movable up or down for selecting the cooking temperature by a threaded control shaft 64 engaged in a threaded opening in top wall 30b of housing 30 and provided with a graduated knob 66.

As the oven temperature approaches a preselected cooking temperature, bellows 18 expands so as to bring bellows post 18a into moving engagement with a projection 62a of lever 62, causing the latter to be pivoted upwardly. As lever 62 and spring 61 are moved through a dead center position with respect to lever 59, the latter will be snapped by spring 61 to the position illustrated in FIG. 2, moving bridging contact 56 out of engagement with contacts 55 so as to extinguish burner 13. As the oven then cools slightly, bellows 18 will contract and lower lever 62 through its dead center position with respect to lever 59 and spring 61, causing the latter to snap contact 56 once again into engagement with contacts 55 and thereby reopening solenoid valve 10. Contacts 55 and 56 will therefore be opened and closed as necessary to cause burner 13 to maintain the oven at the cooking temperature selected by setting knob 66 to adjustably position pivot 63.

As is best illustrated in FIG. 2, expansion of bellows 18 to operate switch contacts 55 and 56 causes lever 27 and rocker arm 31 to move spring arm 22 upwardly to bring contact 23 into engagement with fixed contact 25. When contact 23 engages contact 25, continued movement of arm 27 overcomes the biasing action of spring 34 and causes rocker arm 31 to yieldingly rotate about its pivot 32 to a position such as that shown in FIG. 2.

The cooking phase of the operating cycle continues for a time period determined by the length of cam surface 45b, and is terminated when cam follower 40a rides off of cam surface 45b onto lower cam surface 45a so as to open contacts 41, 43. Upon termination of the cooking phase, cam 45 allows contacts 41 and 42 to close, thereby establishing a circuit from power line L1, through conductor 49, now closed contacts 23 and 25, a conductor 68, an electric fan 69 and a conductor 70 to power line L2. Fan 69 is thereby energized and is so arranged as to cause a flow of air which rapidly dissipates the oven heat. Fan 69 continues to operate as the oven cools until the temperature is reduced to a temperature at which bellows 18 has contracted sufficiently to lower arm 27 and rocker arm 31 to the point of opening of contacts 23 and 25. In the present instance the temperature at which contacts 23 and 25 will open, and at which fan 69 will be deenergized, is approximately 160° F. The oven will continue to cool until contact 23 once again engages contact 24, after which burner 13 will be intermittently operated to maintain the oven temperature at approximately 140° F. for keeping the food hot until removed from the oven for serving. Thus, there will be a satisfied temperature zone of approximately 20° during which the contacts 23 touch neither of contacts 24 or 25.

Figure 4:
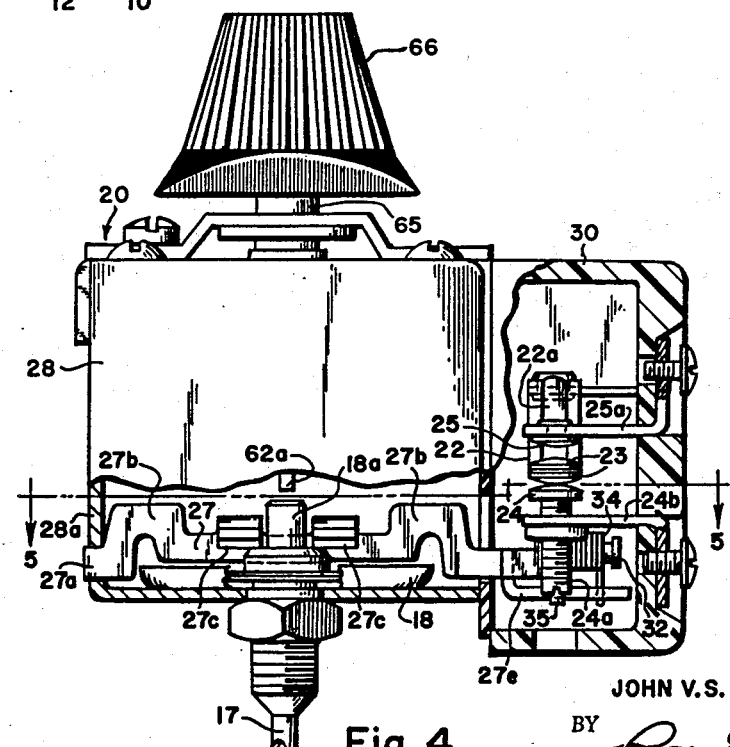
FIG. 4 is a view of a thermostatic control switch device of this invention shown partly in elevation and partly in section.

Referring more particularly now to FIGS. 4 through 7, there is illustrated therein a practical embodiment of the thermostatic control switch device 20 which is particularly suited to use in the above-described oven control system of my invention but may be used with or without obvious modification in other control systems for other purposes. For ease in understanding, parts corresponding to those schematically shown in FIGS. 1, 2 and 3 are given corresponding reference numerals. In this embodiment of control switch device 20 the housing 28 is rectangular and preferably formed of sheet metal. Housing 28 contains the previously described snap switch mechanism, and reference may be had to my Patent No. 2,859,312 for a fuller description of the shape and form of the levers 59 and 62, the pivot means 60 and 63, the arrangement of control shaft 65, and the nature of a bridging contact 66. Suffice it to say that, as shown in FIG. 4, bellows 18 is secured to the inside surface of bottom wall 28c of the switch housing and is in alignment with the projection 62a of lever 62. In this embodiment, lever 27 is in the form of a metal stamping having one end 27a pivotally engaged in an opening in housing wall 28a, and includes offset portions 27b to accommodate the upturned edge of bellows 18, and a pair of spaced projections or bearing members 28 which engage a shoulder formed on bellows post 18a. The end of lever 27, opposite its pivoted end 27a, extends into the auxiliary switch housing 30 which is preferably formed or molded from a suitable rigid insulating material such as "Bakelite." The end of lever 27 within auxiliary housing 30 has a portion 27d which is turned normal to the main extent of the lever and is provided with the pin 32 forming the pivot for rocker arm 31. Spring 34 is conveniently coiled about pin 32 and has one end 34a engaged in an opening 31a in rocker arm 31 and another end 34b engaged in an opening in a platform portion 27e of the lever. Adjusting screw 35 extends through a threaded opening in platform portion 27e for engagement by rocker arm 31 as is best shown in FIG. 6.

Spring arm 22, which carries double contacts 23 at its free end, is secured at its other end to the inner end of a terminal member 22b which extends through, and is secured in, an opening in wall 30a of auxiliary switch housing 30. Contact 24 preferably has a threaded shank portion 24a extending through a threaded opening in the inner end of a terminal member 24b which extends through, and is secured in, another opening in auxiliary switch housing wall 30a. Contact shank 24a is provided with a screw driver slot to which access may be had through an opening 30b in the auxiliary switch housing so that contact 24 may be raised or lowered to decrease or increase, respectively, the differential between the food keeping temperature and the temperature at which fan 69 will become deenergized as the oven cools. Contact 25 is secured to the inner end of a terminal member 25a which likewise extends through, and is secured in, an opening in housing wall 30a. The outer ends of each of the terminal members 22b, 25a and 24b may be provided with suitable connecting means, such as binding screws, for connection to the conductors 49, 68, and 50, respectively.

It will be recognized, of course, that the upper contact 25 and fan 69 may be omitted and the normal cooling of the oven relied upon to arrive at the food keeping temperature. It will also be recognized that the line switch 38 may be actuated by any of the well known types of timing mechanisms for starting an oven or other appliance cycle at a preselected time of day, and terminating the cycle at a subsequent preselected time of day. In this regard the timer motor 46 may be utilized to drive both the cam 45 and the line switch timing mechanism if used, and in which case the motor 46 would be connected directly between lines L1 and L2 for continuous operation.

Figure 8:
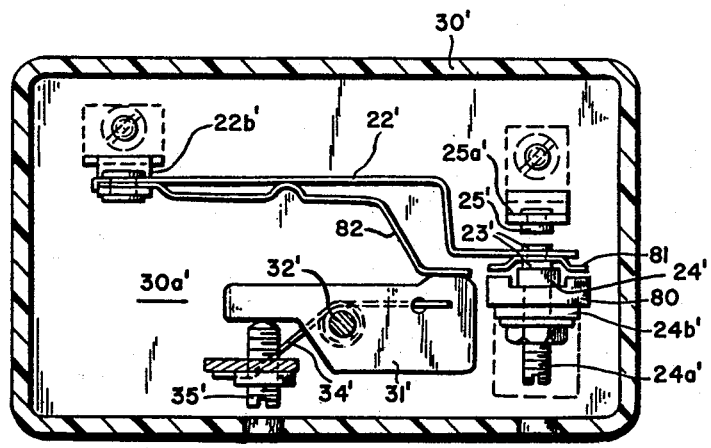
FIG. 8 is a fragmentary sectional view of a modified control device embodying the invention.

Referring now to FIG. 8, there is illustrated therein a modified auxiliary switch means in which parts corresponding to those of FIGS. 1 through 7 have corresponding reference numerals with a prime mark added. In this modified auxiliary switch means a permanent magnet 80 is disposed beneath contact 24' and is adapted to attract an armature 81 mounted on arm 22' adjacent contacts 23'. Magnet 80 serves to hold contacts 23', 24' closed during temperature increases until rocker arm 31' deflects a secondary spring arm 82 sufficiently to overcome the magnetic force, at which time contact 23' is snapped against contact 25'. Conversely, when contact 23' moves away from contact 25' and approaches contact 24', magnet 80 causes contact 23' to be snapped into engagement with contact 24'. Thus, the previously mentioned satisfied temperature zone is substantially eliminated in this embodiment. As may be seen from the drawing, contact 24' may be shifted by means of screw portion 24a' to vary the spacing between armature 81 and magnet 80 to change the holding effect thereof.

Although the invention has been described in considerable detail and with reference to specific embodiments thereof, it will be understood that the invention is not limited thereto, but rather the invention includes all those changes, modifications, and uses which are embraced by the scope of the claims hereof.

Having described my invention, I claim:

1. Oven temperature conditioning apparatus comprising an electrically actuated heating means, an electrically actuated cooling fan, first and second switch means, a selector switch for alternatively connecting said first and second switch means to an electric current supply, said first switch means having first and second operative positions for controlling current supply to said heating means and having a third operative position for connecting said current supply to said fan, said second switch means having first and second operative positions for controlling current supply to said heating means, an expansible power element responsive to temperature conditions in said oven, connecting means between said power element and said first switch means for actuation thereof between its first and second positions at a first oven temperature and for actuation to its third position at a second oven temperature which is higher than the first, said connecting means comprising a member yieldable to movement of said power element in response to temperatures above said second temperature, said power element being adapted to actuate said second switch means to provide a third oven temperature which is higher than the second, and a timing motor connected to said selector switch means so that said first switch means will control operation of the heating means to provide said first oven temperature for a first time period and said second switch means will control operation of said heating means to provide said third oven temperature for a second time period after which said first switch will energize said fan until the oven is cooled to said second temperature and thereafter will control said heating means to maintain said first oven temperature for the remainder of a third time period.

2. An oven control system for automatically controlling electrically actuated oven heating means to provide, for predetermined time periods, a thawing temperature, a cooking temperature, and a keeping temperature; said system comprising first and second switch means, support means for said switch means, a thermally expansible power element mounted on said support means and responsive to oven temperatures, connecting means between said power element and said first switch means for operation thereof between first and second positions so as to actuate said heating means to maintain a first predetermined temperature in said oven, said power element being adapted to operate said second switch means to maintain a second predetermined temperature in said oven, said first switch means being held by said connecting means in a third operative position for operating an electric fan when the oven temperature exceeds a third predetermined temperature between said first and second predetermined temperatures, and a selector switch electrically connected to said first and second switch means, said selector switch being operated by timing means so as to place said first switch means in control of said heating means for a first time period and to place said second switch in control of said heating means for a second time period and then to place said first switch means in control of said fan and said heating means for a third time period.

3. A thermostatic control switch comprising, a first housing including a bottom wall and a side wall, an expansible power element supported in said housing on said bottom wall, a post on said expansible element movable in response to expansion and contraction of said element, an electric switch mechanism having an operating member engageable by said post and movable thereby to actuate said switching mechanism, manually adjustable means to selectively vary the position of said operating member relative to said post, a second housing exteriorly of said first housing and having a side closed by said side wall, a pair of spaced relatively fixed contacts in said second housing, a spring blade contact movable between said fixed contacts and normally biased toward one of said fixed contacts, a lever pivoted at one end in said first housing and extending across said expansible element and movable thereby in response to expansion and contraction of said element, the other end of said lever extending into said second housing through an opening in said side wall, and means forming a yieldable connection between said other end of said lever and said movable spring contact comprising a rocker arm pivoted intermediate its ends to said other end of said lever and having one end engaging said movable contact member, and a spring urging said rocker arm in one direction about its pivot to oppose movement of said spring contact toward said one fixed contact.

4. A thermostatic control switch comprising a first housing including a rear wall and a side wall, an expansible power element in said housing and supported by said rear wall, said power element including a post movable by expansion and contraction of said power element, an electric switch in said first housing including an operating member engaged by said post, manually adjustable means to selectively position said member relative to said post, a lever extending transversely of said power element, means pivoting one end of said lever in said housing adjacent to said power element, the opposite end of said lever extending through an opening in said side wall, said lever being movable by expansion and contraction of said element, a second housing attached to the outside of said first housing and having one side wall common with said side wall of said first housing, a pair of spaced contacts fixed in said second housing adjacent to one end thereof, a spring blade contact attached at one end adjacent to the other end of said second housing and having the opposite end movable to alternatively engage said spaced contacts and being normally biased toward one of said contacts, the portion of said lever extending into said housing being turned to extend parallel to said blade contact, a rocker arm pivoted to the outer end of said turned portion of said lever and extending generally parallel to said blade contact, a tab integral with said lever adjacent to the inner end thereof and projecting laterally therefrom, a screw stop threaded through said tab in alignment with one end of said rocker arm, and a spring urging said one end of said rocker arm into engagement with said screw, the other end of said rocker arm engaging said blade contact, the force of said spring urging said rocker arm to said screw being in excess of the bias of said blade toward said one fixed contact.

References Cited by the Examiner
UNITED STATES PATENTS

| | | | |
|---|---|---|---|
| 1,720,723 | 7/29 | Dodge | 200—136.3 |
| 1,931,464 | 10/33 | Dicke | 200—136.3 |
| 2,381,427 | 8/45 | Andersson | 200—140 X |
| 2,402,151 | 6/46 | Dewey | 200—139 |
| 2,758,178 | 8/56 | Eskin | 200—140 |
| 2,804,525 | 8/57 | Mantz | 200—140 |
| 2,889,431 | 6/59 | Noakes | 200—140 |
| 3,010,657 | 11/61 | Post | 236—15 |

EDWARD J. MICHAEL, *Primary Examiner.*

RICHARD M. WOOD, ALDEN D. STEWART,
*Examiners.*